(12) United States Patent
Palmor et al.

(10) Patent No.: US 12,105,565 B2
(45) Date of Patent: Oct. 1, 2024

(54) HINGED DUAL DISPLAY COMPUTING DEVICE

(71) Applicant: Microsoft Technology Licensing, LLC, Redmond, WA (US)

(72) Inventors: Idan Palmor, Ramat Gan (IL); Gilad Pundak, Rehovot (IL); Matan Slassi, Tel Aviv (IL); Dmitry Birenberg, Rosh Ha Ayin (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/158,372

(22) Filed: Jan. 23, 2023

(65) Prior Publication Data

US 2023/0161389 A1 May 25, 2023

Related U.S. Application Data

(63) Continuation of application No. 17/101,872, filed on Nov. 23, 2020, now Pat. No. 11,561,589.

(60) Provisional application No. 63/076,304, filed on Sep. 9, 2020.

(51) Int. Cl.
*G06F 1/16* (2006.01)
*G06F 3/041* (2006.01)
*G06F 3/044* (2006.01)

(52) U.S. Cl.
CPC .......... *G06F 1/1681* (2013.01); *G06F 1/1643* (2013.01); *G06F 1/1647* (2013.01); *G06F 3/0412* (2013.01); *G06F 3/044* (2013.01)

(58) Field of Classification Search
CPC .... G06F 1/1681; G06F 1/1643; G06F 1/1647; G06F 3/0412; G06F 3/044
USPC .............................. 361/679.01; 345/173–174
See application file for complete search history.

(56) References Cited

U.S. PATENT DOCUMENTS

| 10,592,051 | B1* | 3/2020 | Yildiz | G06F 1/1694 |
| 2012/0084709 | A1* | 4/2012 | Sirpal | G06F 3/04847 |
| | | | | 715/781 |
| 2018/0088633 | A1* | 3/2018 | Whitman | G06F 1/1677 |
| 2019/0034147 | A1* | 1/2019 | Koki | G06F 1/1616 |
| 2019/0064950 | A1* | 2/2019 | Hsu | G06F 1/1616 |

(Continued)

FOREIGN PATENT DOCUMENTS

WO WO-2020063135 A1 * 4/2020 ............... G01B 7/30

*Primary Examiner* — Kwin Xie
(74) *Attorney, Agent, or Firm* — Alleman Hall & Tuttle LLP

(57) ABSTRACT

A computing device is provided comprising a processor, a first display device having a first capacitive touch sensor, a second display device having a second capacitive touch sensor, and a hinge positioned between and coupled to each of the first display device and the second display device, the first display device and second display device being rotatable about the hinge and separated by a hinge angle. The processor is configured to detect the hinge angle at a first point in time, determine that the hinge angle at the first point in time is outside a first predetermined range, and upon at least determining that the hinge angle is outside the first predetermined range, perform run-time calibration of at least a plurality of rows of the capacitive touch sensor of the first display device and of the capacitive touch sensor of the second display device.

18 Claims, 9 Drawing Sheets

(56) References Cited

U.S. PATENT DOCUMENTS

2019/0101578 A1* 4/2019 Lawrence ......... G06F 3/041661

* cited by examiner

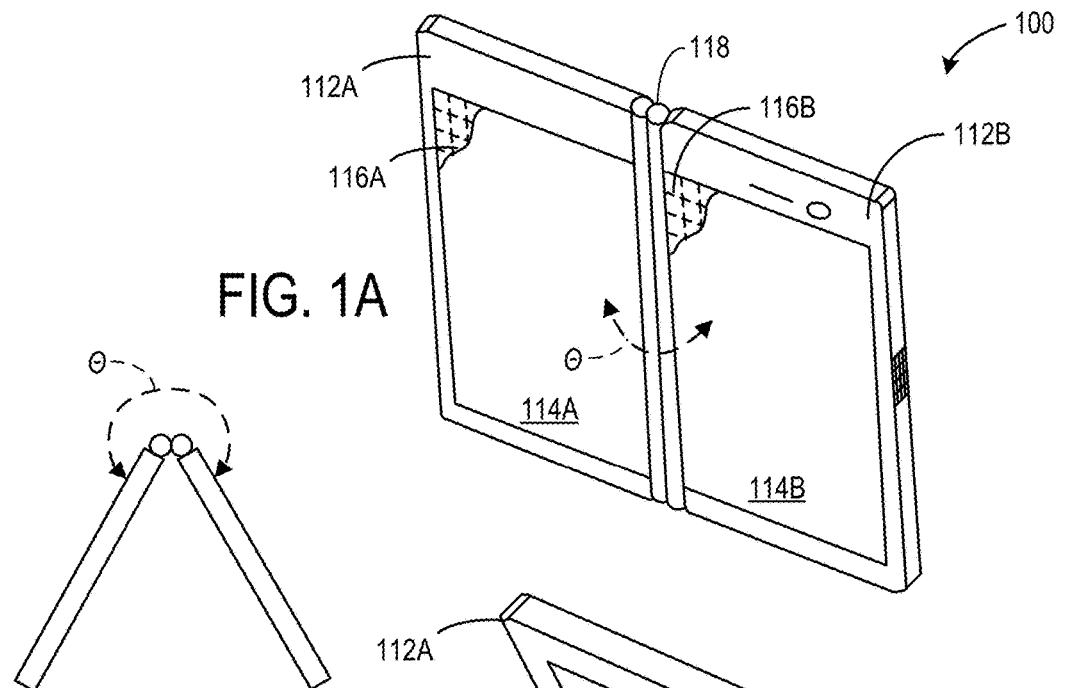
FIG. 1A
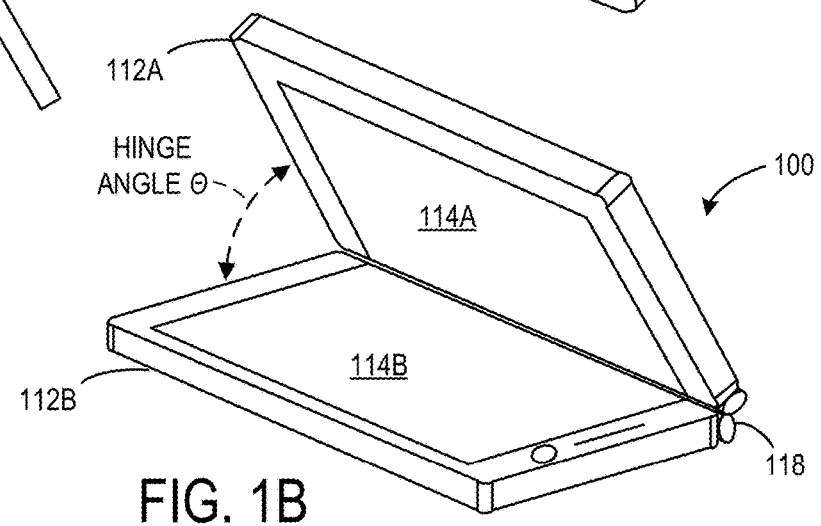
FIG. 1E
FIG. 1B
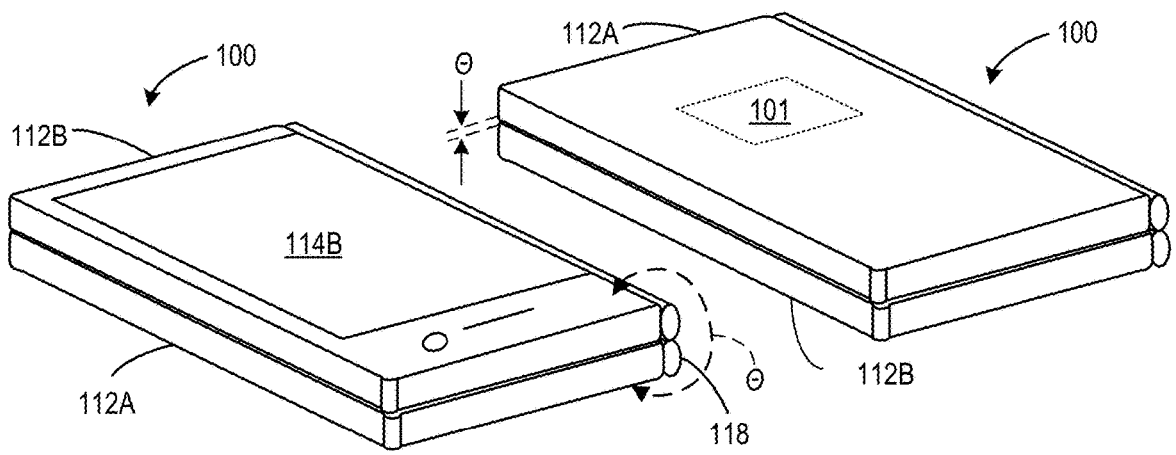
FIG. 1C
FIG. 1D

CAPACITANCE MAP OF CAPACITIVE TOUCH
SENSOR AT 10 DEGREE HINGE ANGLE

HINGED DUAL DISPLAY COMPUTING DEVICE

CROSS REFERENCE TO RELATED APPLICATIONS

This application is a continuation of U.S. Non-Provisional patent application Ser. No. 17/101,872, filed Nov. 23, 2020, which claims priority to U.S. Provisional Patent Application Ser. No. 63/076,304, filed Sep. 9, 2020, the entirety of each of which is hereby incorporated herein by reference for all purposes.

BACKGROUND

Hinged computing devices with two touch sensitive displays coupled by a hinge have recently been developed. The displays can be operated in a variety of poses with the hinge adjusted to different hinge angles. For example, the hinged computing device can be folded to low hinge angles below 90 degrees, laid flat at hinge angles around 180 degrees, propped in a tent shape on a table hinge angles around 270 degrees, or fully opened with the displays oriented in opposite directions at 360 degrees. Operational challenges related to the touch sensors in some of these orientations are explained below.

SUMMARY

A computing device is provided. The computing device comprises a processor, a first display device having a first capacitive touch sensor, a second display device having a second capacitive touch sensor, and a hinge positioned between and coupled to each of the first display device and the second display device. The first display device and second display device are rotatable about the hinge and separated by a hinge angle. The processor is configured to detect the hinge angle at a first point in time, and to determine that the hinge angle at the first point in time is outside a first predetermined range. The processor is further configured to upon at least determining that the hinge angle is outside the first predetermined range, perform run-time calibration of at least a plurality of rows of the capacitive touch sensor of the first display device and of the capacitive touch sensor of the second display device. The processor is further configured to detect the hinge angle at a subsequent point in time, determine that the hinge angle at the subsequent point in time is within the first predetermined range, and upon determining that the hinge angle at the subsequent point is within the first predetermined range, stop performing run-time calibration of at least a portion of the capacitive touch sensor of the first display device and/or of at least a portion of the capacitive touch sensor of the second display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A shows a computing device with dual displays coupled for relative rotational movement by a hinge, according to one embodiment of the present disclosure, in a flat configuration with a hinge angle of 180°.

FIG. 1B shows the computing device of FIG. 1 in a folded configuration with a hinge angle of 45°.

FIG. 1C shows the computing device of FIG. 1 in a back-to-back configuration with a hinge angle of 360°.

FIG. 1D shows the computing device of FIG. 1 in a closed configuration with a hinge angle of 0°.

FIG. 1E shows the computing device of FIG. 1 in a tent configuration with a hinge angle of 270°.

DETAILED DESCRIPTION

Figure 2A:
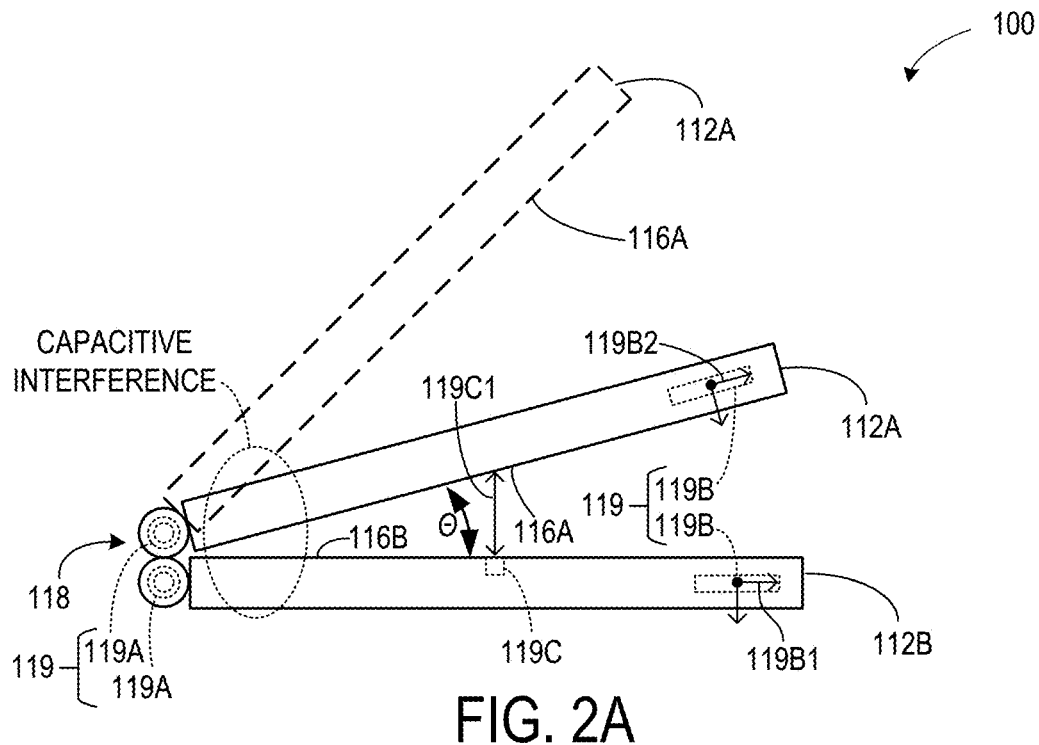
FIG. 2A is a bottom view of the hinged computing device of the present disclosure, showing two configurations of a hinge angle sensor.

One technical challenge with hinged computing devices is that as the displays are moved closer to each other when the hinge is closed, capacitive touch sensors can malfunction. Specifically, malfunctions in touch sensing have been observed due to real-time calibration operations being adversely affected by the proximity of the displays. Real-time calibration operations are performed on some capacitive touch displays to periodically readjust the calibration of the touch sensors based on background capacitance measurements when no touches are detected. It has been determined that as the touch sensors of each display draw closer to each other when real-time calibration is being performed, the sensed capacitance at each display changes due to the proximity of the other display, particular in the closest portions of each display near the hinge. As a result, especially in the portions of each display near the hinge, false touches may be detected and real touches may erroneously not be detected.

Another technical challenge exists in presenting a coherent visual presentation of displayed content when both displays are extended into a single composite display, as may be desired, for example, when the hinged display is positioned flat with both displays facing the same direction and the hinge angle is approximately 180 degrees. For example, in hinged display devices with a mechanical hinge that is positioned between two emissive display surfaces, the mechanical hinge can be visually disruptive and detract from the user's ability to consume the displayed content. While foldable OLED displays have been developed that feature a living hinge formed in the middle of the emissive display surface rather than a mechanical hinge, they are expensive and have sometimes been found to suffer from defects with repeated use. Thus, reducing the adverse visual effects of a mechanical hinge between two emissive displays across which a single desktop or application is displayed, remains a challenge.

To address the above issues, as shown in FIGS. 1A-E, a computing device 100 in accordance with one example embodiment of the present invention is disclosed. The computing device 100 comprises a first display device 112A having first display surface 114A, and a first capacitive touch sensor 116A. The computing device 100 further comprises a second display device 112B having a second display surface 114B and a second capacitive touch sensor 116B. The first and second display devices 112A, 112B are hinged together for relative rotational motion via a hinge 118, that may be positioned at various hinge angles θ. Hinge 118 is positioned between and coupled to each of the first display device 112A and the second display device 112B. The first display device 112A and the second display device 112B are rotatable about the hinge 118 and separated by the hinge angle. The hinge angle is defined as an angle between the first display surface 116A and the second display surface 116B. The hinge 118 is rotatable such that the hinge angle may have any value between 0° and 360°.

The respective display surfaces 114A, 114B are configured to display images, which may be formed independently of one another or in combination as a combined logical display, as will be described in detail below. While the first and second capacitive touch sensors 116A, 116B are illustrated in a capacitive grid configuration, it will be appreciated that other types of capacitive touch sensors and configurations may also be used, such as, for example, a capacitive diamond configuration. The capacitive touch sensors are typically at least partially transparent, being manufactured, for example, of indium tin oxide (ITO). The first and second capacitive touch sensors 116A, 116B are configured to detect a touch input caused by a change in capacitance between driven electrodes and read electrodes in the grid resulting from objects on or near the display devices 112A, 112B, such as a user's finger, hand, stylus, etc.

FIGS. 1A-1E illustrate the computing device 100 in various configurations. FIG. 1A illustrates the computing device 100 in a flat configuration, with the hinge angle at 180 degrees. FIG. 1B illustrates the computing device 100 in a folded configuration with the hinge angle at 45 degrees. FIG. 1C illustrates the computing device 100 in a back-to-back configuration, with a hinge angle of 360 degrees. FIG. 1D illustrates the computing device 100 in a face to face configuration, with a hinge angle of 0 degrees. FIG. 1E illustrates the computing device 100 in a tent configuration, with a hinge angle of 270 degrees.

Turning now to FIG. 2A, computing device 100 further includes one or more hinge angle sensors 119 configured to detect the hinge angle between the first and second display surfaces 114A, 114B of the first and second display devices 112A, 112B. The hinge angle sensor 119 may be a potentiometer 119A (or variable resistor) positioned in the hinge 118 and configured to measure the angle of the hinge 118. In the illustrated embodiment, the hinge 118 is a double hinge and a respective potentiometer 119A is provided in each hinge. By reading the measured value of each potentiometer 119A, a total value for the hinge angle θ may be computed. Alternatively, a single hinge with a single potentiometer 119A may be utilized. In addition or as an alternative to the one or more potentiometers 119A, one or a pair of inertial measurement units (IMUS) 119B may be provided. In the depicted embodiment, a respective IMU 119B is positioned in each of the first and second display devices 112A, 112B. Each IMU is configured to produce a respective six degree of freedom (6DOF) vector 119B1, 119B2 indicating its relative acceleration around three axes including a vertical axis that points toward the earth, as well as pitch, yaw, and roll. The hinge angle θ may be computed by subtracting the two 6DOF vectors. Instead of IMUs, other types of accelerometers or gyroscopes could be utilized to obtain similar measurements and compute the hinge angle. As yet another alternative, in addition or alternatively to the potentiometer 119A and IMUs 119B, a depth camera 119C may be positioned in one of the first and second display device 112A, 112B and configured to measure a depth 119C1 to the opposite display device. This depth 119C1 could be used to determine a hinge angle of the computing device 100 for values less than 90 degrees, for example.

Figure 2B:
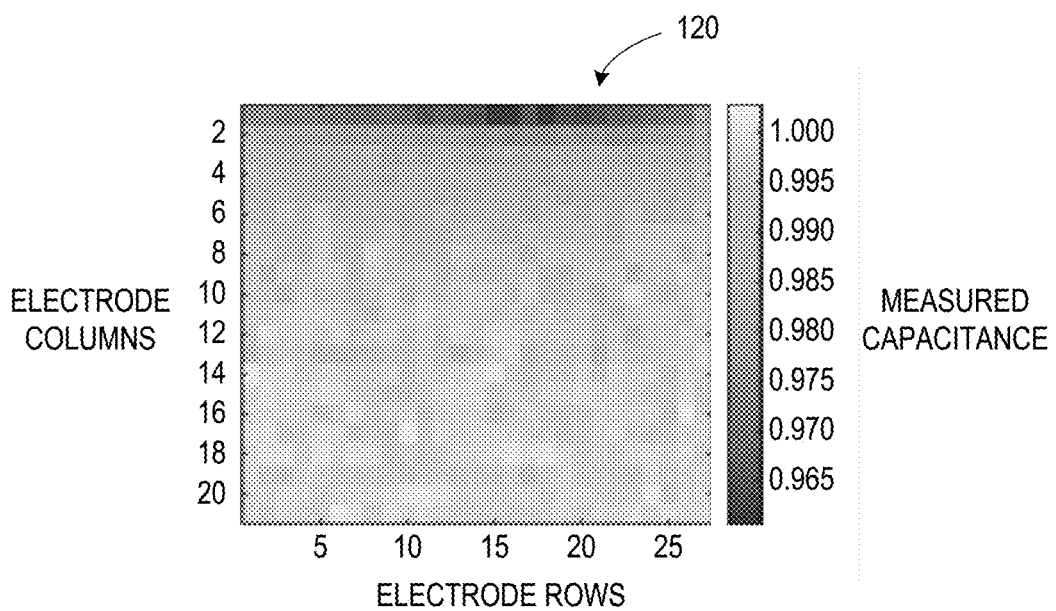
FIG. 2B is a capacitance map of a capacitive touch sensor of the computing device of FIG. 1.

Turning to FIG. 2B, an example capacitance map 120 is provided for a capacitive touch sensor of the computing device when the hinge angle is 10 degrees. The capacitance map 120 shows measured capacitances of electrodes arranged in columns and rows. Capacitance maps 120 are discussed in more detail below in relation to FIG. 3.

Figure 3:
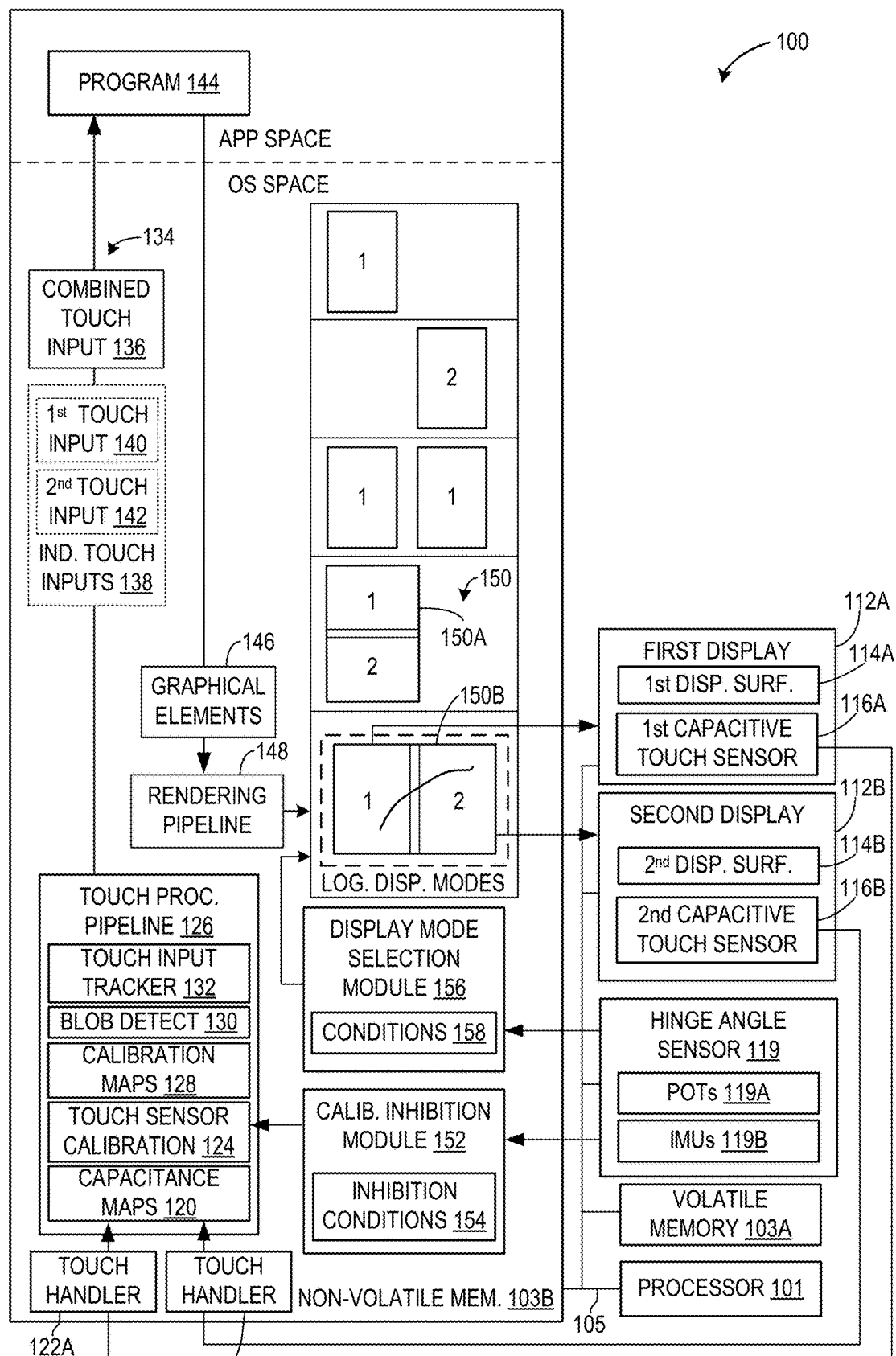
FIG. 3 is a schematic view illustrating software and hardware components of the computing device of FIG. 1.

Turning now to FIG. 3, a software and hardware architecture of the computing device 100 is illustrated in schematic view. Processor 101 is illustrated as being connected via a bus 105 to a volatile memory 103A, non-volatile memory 103B, hinge angle sensor 119, first display device 112A, and second display device 112B. Programs stored in non-volatile memory 103B are executed by the processor 101 using portions of volatile memory 103A.

FIG. 3 generally illustrates a loop between detection of touch inputs and output of graphical elements for display. Beginning with the detection of touch inputs, during operation each of the first and second capacitive touch sensors 116A, 116B of the first and second display devices 112A, 112B are configured to continuously output their capacitances in the form of capacitance maps 120 to an associated touch handler 122A, 122B for each display 112A, 112B. The touch handlers 122A, 122B pass the capacitance maps 120 to a touch sensor calibration module 124 of a touch processing pipeline 126, which performs on the fly, i.e., realtime, touch sensor calibration by applying calibration maps 128 to the capacitance maps 120, to thereby produce calibrated capacitance maps. The calibrated capacitance map is passed to a blob detection module 130, which determines the areas of the capacitive touch sensor 116A, 116B that are touched, after ignoring, i.e., rejecting, areas such as palms or forearms, which are not deemed part of the user's intended touch. The blob detection module 130 may be configured to detect and distinguish between touch and hover inputs. To achieve this, the blob detection module 130 may be configured to apply a first predetermined touch capacitance difference threshold to the adjusted capacitance map to discern where the display is being touched, and a second predetermined hover capacitance difference threshold, which is lower than the first predetermined touch capacitance difference threshold, to detect hover of a user's digit. In a typical application, a centroid of each blob detected by the blob detection module 130 is passed to a touch input tracker 132.

The touch input tracker 132 is configured to track various touches over time using tracking algorithms that take into account the size, position, and motion of each blob, and organize them into one or more touch inputs 134. On a multitouch display, for example, a first touch input 140 might be recognized as a series of contacts detected as a left index finger slides across the display and a second touch input 142 might be recognized as a series of contacts detected from a right index finger sliding across the display concurrently. A touch input typically begins with a digit down event at which time point a blob is initially detected and ends with a digit up event at which point in time the tracked blob is detected as no longer being in contact. If a blob enters from off the screen a digit down event occurs at the outermost row or column, and if a blob exits the screen a digit up event occurs, and the touch event ends. As will be described in detail below, the touch input tracker 132 processes the touch inputs differently depending on the detected hinge angle indicating the configuration of the first and second display devices 112A, 112B. For example, when the hinge angle of the computing device 100 is around 180 degrees, a touch that extends across the hinge from the first to the second display device or from the second to the first display device is processed as a combined touch input 136, while in other modes such as tent mode, the touch inputs 134 from each capacitive touch sensor 116A, 116B are processed as independent touch inputs 138, such that the first touch input 140 and second touch input 142 are each output by the touch input tracker 132.

Touch inputs 134 from the touch input tracker 132 are passed to a program 144 executed by processor 101. The program 144 may be an application program, an operating system component, utility or driver program, etc. The program 144 contains program logic that processes the touch inputs 134 and generates appropriate graphical elements 146 for display. The graphical elements 146 are sent from the program 144 to a rendering pipeline 148 of the operating system of the computing device 100. The rendering pipeline 148 prepares the graphical elements for display on one or more of the first and second display devices 112A, 112B. At any given time, depending on the hinge angle and vertical orientation of the computing device 100, a suitable logical display mode is selected. The logical display mode may indicate, for example, that only the first display device 112A is active, or only the second display device 112B is active, and the graphical elements 146 should displayed on one or the other, whichever is active. The logical display mode may alternatively indicate that the graphical elements should be displayed on both display devices, referred to as display mirroring. Finally, when a hinge angle is detected as being within a suitable range as discussed below, a simulated gap combined display mode 150 may be selected that extends the first and second display devices 112A, 112B into a single logical display with a simulated gap therein. The simulated gap combined display mode 150 may be oriented vertically or horizontally (so called picture or landscape) as illustrated at 150A and 150B. The graphical elements 146 displayed on the first and second display devices 112A, 112B in the simulated gap combined display mode, will be displayed with a gap between the regions of the logical display that are mapped to each of the first and second physical display devices 112A, 112B, to enhance visual coherence of the displayed content to the user, as explained below.

Capacitance measurements by the first and second capacitive touch sensors 116A, 116B can be affected by various factors including temperature and humidity in the environment. Under certain conditions, these environmental changes can lead to false touches and missed touches. To address this, in a process referred to as run-time calibration background capacitances are measured in a touch-free state by the touch sensor calibration module 124 and compared by the blob detection module 130 to continuously measured capacitances during operation, to determine whether a change in capacitance has occurred that is above a threshold change, and that thus indicates that one of the display devices 112A, 112B is in a touched state at a particular location on the capacitive touch sensor 116A, 116B.

Processor 101, executing the touch sensor calibration module 124, is configured to perform run-time calibration of the capacitive touch sensor 116A of the first display device 112A and of the capacitive touch sensor 116B of the second display device 112B. Run-time calibration includes, in a touch-free state measuring a first background capacitance at a selected set of a plurality of electrodes of the first capacitive touch sensor 116A, and measuring a second background capacitance at a selected set of a plurality of electrodes of the second capacitive touch sensor 116B. Run-time calibration further includes generating a first calibration map of the first capacitive touch sensor 116A based on the measured first background capacitance and generating a second calibration map of the second capacitive touch sensor 116B based on the measured second background capacitance. Each of the first and second calibration maps includes a calibration value for each electrode in each of the respective first and second capacitive touch sensors 116A, 116B. The processor 101 is configured to save the first and second calibration maps as saved calibration maps 128 in memory.

As described above, a challenge exists in calibrating the capacitive touch sensors 116A, 116B at certain values of the hinge angle. This is due to an interference between electrodes of the first capacitive touch sensor 116A and electrodes of the second capacitive touch sensor 116B. As show in in FIG. 2A, as the value of the hinge angle changes, the distance between the capacitive touch sensors 116A, 116B (and therefore a distance between the respective electrodes of those capacitive touch sensors) also changes. Thus the interference is higher for relatively smaller values of the hinge angle compared relatively larger values of the hinge angle. Additionally, the interference is higher for electrodes near the hinge 118, compared to electrodes far from the hinge 118. Thus, malfunction of the touch sensor is most problematic in regions of the touch sensors 114A, 114B closer to the hinge 118, as shown by the dashed line indicating capacitive interference. An additional challenge exists in that the background capacitances of the electrodes of the first and second capacitive touch sensors 116A, 116B can change as a result of several factors including environmental temperature, humidity, operating temperature of the computing device 100, age of the computing device 100, proximity of the computing device 100 to people or objects, as well as other factors.

In order to mitigate the challenges described above, it is beneficial to intermittently detect the hinge angle at different points in time, and/or as a result of determining that the hinge angle is within a predetermined range or at a predetermined value, perform corrective functions including performing run-time calibration or recalibration of the first and second capacitive touch sensors 116A, 116B. Additional corrective functions of the present computing device 100 include deactivating all or a portion of one or both of the capacitive touch sensors 116A, 116B, and/or deactivating all or a portion of one or both of the display surfaces 114A, 114B. Thus, the computing device 100 is configured to perform run-time calibration in different scenarios.

A first example scenario is now given wherein the processor 101 is configured to detect the hinge angle at a first point in time, determine that the hinge angle at the first point in time is outside a first predetermined range, and upon at least determining that the hinge angle is outside the first predetermined range, perform run-time calibration of at least a plurality of rows of the capacitive touch sensor 116A of the first display device 112A and of the capacitive touch sensor 116B of the second display device 112B.

The processor 101 may be configured to execute a calibration inhibition module 152, which can detect predetermined inhibition conditions 154 and inhibit the run-time calibration, at least temporarily, to mitigate the adverse effects of capacitive interference discussed above. For example, the processor 101 may be further configured to detect the hinge angle at a subsequent point in time, determine that the hinge angle at the subsequent point in time is within the first predetermined range, and upon determining that the hinge angle at the subsequent point is within the first predetermined range, stop performing run-time calibration of at least a portion of the capacitive touch sensor 116A of the first display device 112A and/or of at least a portion of the capacitive touch sensor 116B of the second display device 112B.

As discussed above, interference is not necessarily uniform across the first or second capacitive touch sensors 114A, 114B. Therefore it is beneficial, under certain conditions (e.g. certain values of the hinge angle) for run-time calibration to be applied to only a portion of the capacitive touch sensors 116A, 116B. Continuing with the above first example scenario, upon determining that the hinge angle at the first point in time is outside the first predetermined range, the selected set of the plurality of electrodes of the capacitive touch sensors 116A, 116B of the first and second display devices 112A, 112B includes all of the plurality of electrodes of the capacitive touch sensors 116A, 116B of the first and second display devices 112A, 112B. Thus in a condition wherein the hinge angle is outside the first predetermined range, and/or that the capacitive interference is low (low relative to a condition wherein the hinge angle is within the first predetermined range) the processor 101 is configured to calibrate all of the plurality of electrodes in the capacitive touch sensors 116A, 116B of the first and second display devices 112A, 112B.

Upon determining that the hinge angle at the subsequent point in time is within the first predetermined range, the selected set of the plurality of electrodes of the capacitive touch sensors 116A, 116B of the first and second display devices 112A, 112B selects only a subset of the plurality of electrodes of the capacitive touch sensors 116A, 116B of the first and second display devices 112A, 112B positioned at least a predetermined distance from the hinge 18. Thus in a condition wherein the hinge angle is within the first predetermined range, and/or that the capacitive interference is high (high relative to a condition wherein the hinge angle is within the first predetermined range) the processor 101 is configured to calibrate only a subset of the plurality of electrodes in the capacitive touch sensors 116A, 116B of the first and second display devices 112A-B.

In the above example scenario, the first predetermined range is greater than or equal to 0° and less than 10°. In other examples, the first predetermined range may be between 0° and 15°, or between 0° and 20° for example. However, it will be appreciated that the first predetermined range may be defined by other suitable values. The values may be preset, defined by the user, defined by an update to the computing device 100, or defined as the result of another process.

While run-time calibration is stopped, the computing device 100 can detect touch via one or both of the first and second capacitive touch sensors 116A, 116B. The processor 101 is further configured to, while run-time calibration is stopped, detect a first touch input via the first capacitive touch sensor 116A of the first display device 112A, and/or detect a second touch input via the second capacitive touch sensor 116B of the second display device 112B.

In some cases, for example, wherein capacitive interference is high enough to prevent touch from being detected on portions of the display devices 112A, 112B, it is beneficial to disable touch sensing on portions of the first and second display devices 112A, 112B. To accommodate these cases, the processor 101 is further configured to detect only on a portion of the first display device 112A a first touch input via the first capacitive touch sensor 116A of the first display device 112A, the portion of the first display device 112A being beyond a predetermined distance from the hinge 118, and detect only on a portion of the second display device 112B a second touch input via the second capacitive touch sensor 116B of the second display device 112B, the portion of the second display device 112B being beyond a predetermined distance from the hinge 118. The predetermined distance may be defined in terms of units of distance (e.g., mm) or in terms of rows of electrodes in the first and second display devices 112A, 112B.

As discussed above, the background capacitance of the electrodes of the first and second capacitive touch sensors 116A, 116B can change over time for reasons including the value of the hinge angle and environmental factors. Therefore, it is beneficial to intermittently resume run-time calibration to account for changes in background capacitance. For example in order to accommodate a state in which the hinge angle is outside the first predetermined range, the processor 101 is further configured to, upon determining that the hinge angle at a later subsequent point in time is outside the first predetermined range, resume performing run-time calibration of the capacitive touch sensor 116A of the first display device 112A and of the capacitive touch sensor 116B of the second display device 112B.

In addition to performing run-time calibration to generate calibration maps, the computing device 100 can retrieve from memory preset calibration maps. The preset calibration maps can be user-generated, pre-loaded in the computing device 100, the saved calibration maps described above, or provided with an update to the computing device. The preset calibration maps are applied in order to address cases in which calibration maps generated by run-time calibration are not representative of current conditions of the computing device 100. For example, the processor 101 is further configured to upon detecting that the hinge angle crosses above a predetermined angular threshold higher than an upper threshold of the first predetermined range, apply a first preset calibration map to the first display device 112A and a second preset calibration map to the second display device 112B, the first and second preset calibration maps being retrieved from memory. In this example, the predetermined angular threshold is in a range between 35° to 55°, however other ranges may be used.

As described above, another technical challenge exists in presenting a coherent visual presentation of displayed content when both display devices 112A, 112B are extended into a single composite display. For some values of the hinge angle, for example 360° as shown in FIG. 1C, it is useful to have the first and second display devices 112A, 112B configured to operated independently of each other, and/or to have one of the display devices deactivated. For other values of the hinge angle, for example 180° as shown in FIG. 1A, it is useful to have the first and second display devices 112A, 112B configured to operate in conjunction with each other as a single logical display extended over two physical displays. A description of the manner which computing device 100 addresses this challenge is now provided.

Referring briefly to FIG. 3, the processor 101 may be configured to execute a display mode selection module 156, which is configured to detect certain predetermined conditions 158 for selecting a display mode. The conditions 158 may include that the hinge angle is within a certain range, as discussed below. Upon detecting the conditions for a particular display mode, the display mode selection module 156 is configured to select an appropriate display mode, as described in detail below.

Figure 4A:
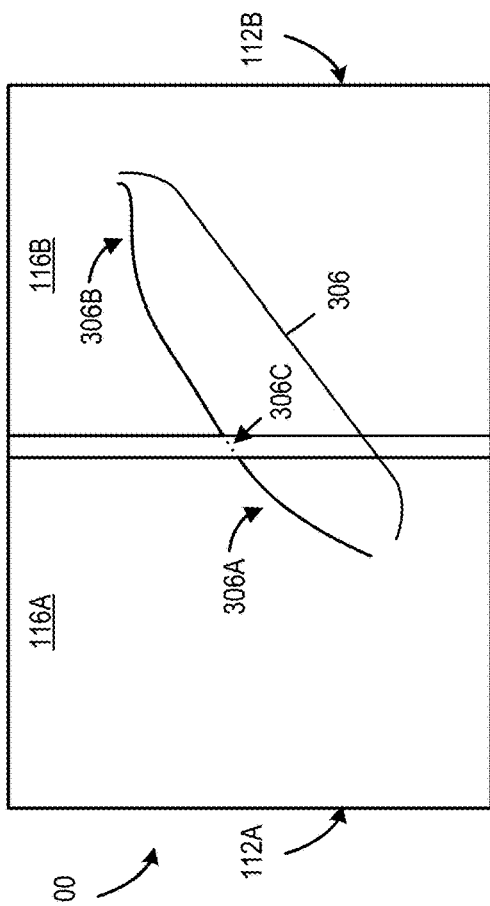
FIG. 4A is a schematic view of a logical display of the computing device of the present disclosure.

Turning to FIG. 4A, a schematic view of a logical display 300 for a simulated combined gap mode is shown. In order to support the first and second display devices 112A, 112B operating in conjunction, the processor 101 is configured to detect that the hinge angle is in a flat mode range and in response set a display mode to a simulated gap combined display mode 150. In this example the flat mode range is greater than 135° and less than 225°, however other ranges may be used for the flat mode range.

The processor is further configured to in the simulated gap combined display mode 150, define the logical display 300 that includes a first display region 302A (shown in dashed outline) corresponding to pixels displayed on the first display device 112A, a second display region 302B (shown in dashed outline) corresponding to pixels displayed on the second display device 112B and a simulated gap 302C between the two regions corresponding to pixels that are not displayed on either the first display device 112A or the second display device 112B.

The logical display 300, includes a first calibration exclusion region 303A and a second calibration exclusion region 303B corresponding to a second subset of the plurality of electrodes of the capacitive touch sensors of the first and second display devices 112A, 112B positioned within at least the predetermined distance from the hinge 118. The predetermined distance is shown as $d_1$ within the first display region 302A and as $d_2$ within the second display region 302B. Typically, $d_1$ and $d_2$ have the same value, however, $d_1$ and $d_2$ may alternatively have different values.

Figure 4B:
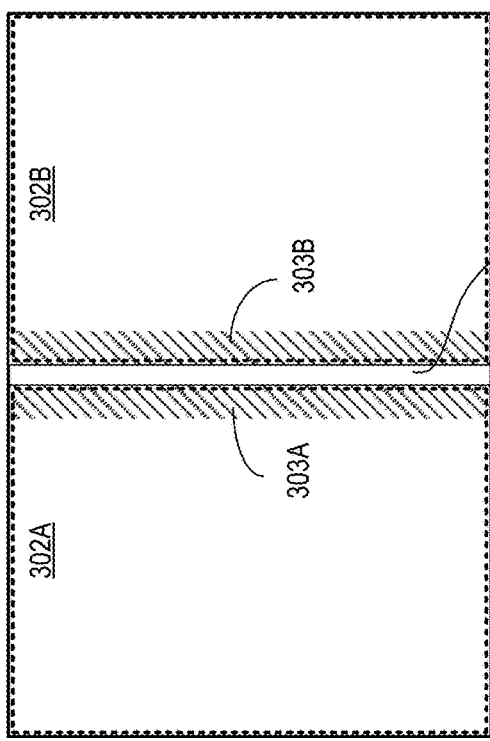
FIG. 4B is a schematic view of the computing device of the present disclosure detecting touch input.

Turning now to FIG. 4B, a schematic representation of the computing device 100 detecting touch input is provided. The processor 101 is further configured to detect a first touch input 140 via the first capacitive touch sensor 116A of the first display device 112A, detect a second touch input 142 via the second capacitive touch sensor 116B of the second display device 112B, and combine the first touch input 140 and the second touch input 142 into a combined touch input 120.

Figure 4C:
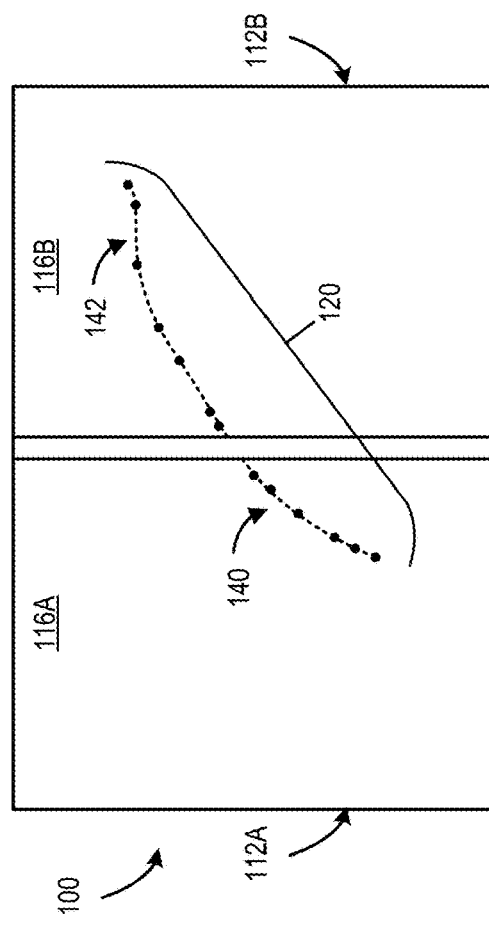
FIG. 4C is a schematic view of the computing device of the present disclosure displaying a graphical element.

Continuing to FIG. 4C, a schematic view of the computing device 100 displaying a graphical element 306 is provided. The processor 101 is further configured to display the graphical element 306 corresponding to the combined touch input across the simulated gap 302C. In displaying the graphical element 306, a first portion 306A of the graphical element 306 is displayed on the first display device 112A, a second portion 306B of the graphical element 306 is displayed on the second display device 112B, and a third portion 306C of the graphical element 306 is not displayed due to its position within the simulated gap in the logical display.

As shown in FIGS. 4A-C, the processor 101 is further configured to display the first display region 302A on the first display device 112A, and display the second display region 302B on the second display device 112B such that the first and second display regions 302A, 302B are displayed on the computing device 100 in relative positions with a gap between them so as to have a same aspect ratio as the logical display 300. Furthermore, a number of pixels in the simulated gap of the logical display 300 multiplied by a pixel width in the first display device 112A and second display device 112B is substantially equal to a width of a gap between displayed pixels on the first and second display devices 112A-B.

In addition to the above described mode, the computing device 100 is also configured such that the computing device 100 operates in a tent mode. To operate in the tent mode, the processor 101 is further configured to detect the hinge angle within a tent mode range, and in response adjust a touch input setting such that the first display device 112A and the second display device 112B are not linked for detecting hinge-crossing touch inputs. In this example, the tent mode range is greater than 225° and equal to or less than 360°, however other ranges may be used. In the tent mode, the processor 101 is further configured to detect at least one of a first touch input 140 via the first capacitive touch sensor 116A of the first display device 112A and a second touch input 142 via the second capacitive touch sensor 116B of the second display device 112B; and process the first touch input 140 independently of the second touch input 142. The first and second touch inputs 140, 142 may be used for a variety of purposes including prompting applications to start, performing functions within the applications, or displaying graphical elements. In order to display graphical elements, the processor 101 is further configured to, as a result of processing the first touch input 140 independently of the second touch input 142, display a first graphical element corresponding to the first touch input 140 on the first display device 112A and a second graphical element corresponding to the second touch input 142 on the second display device 112B.

Figure 5A:
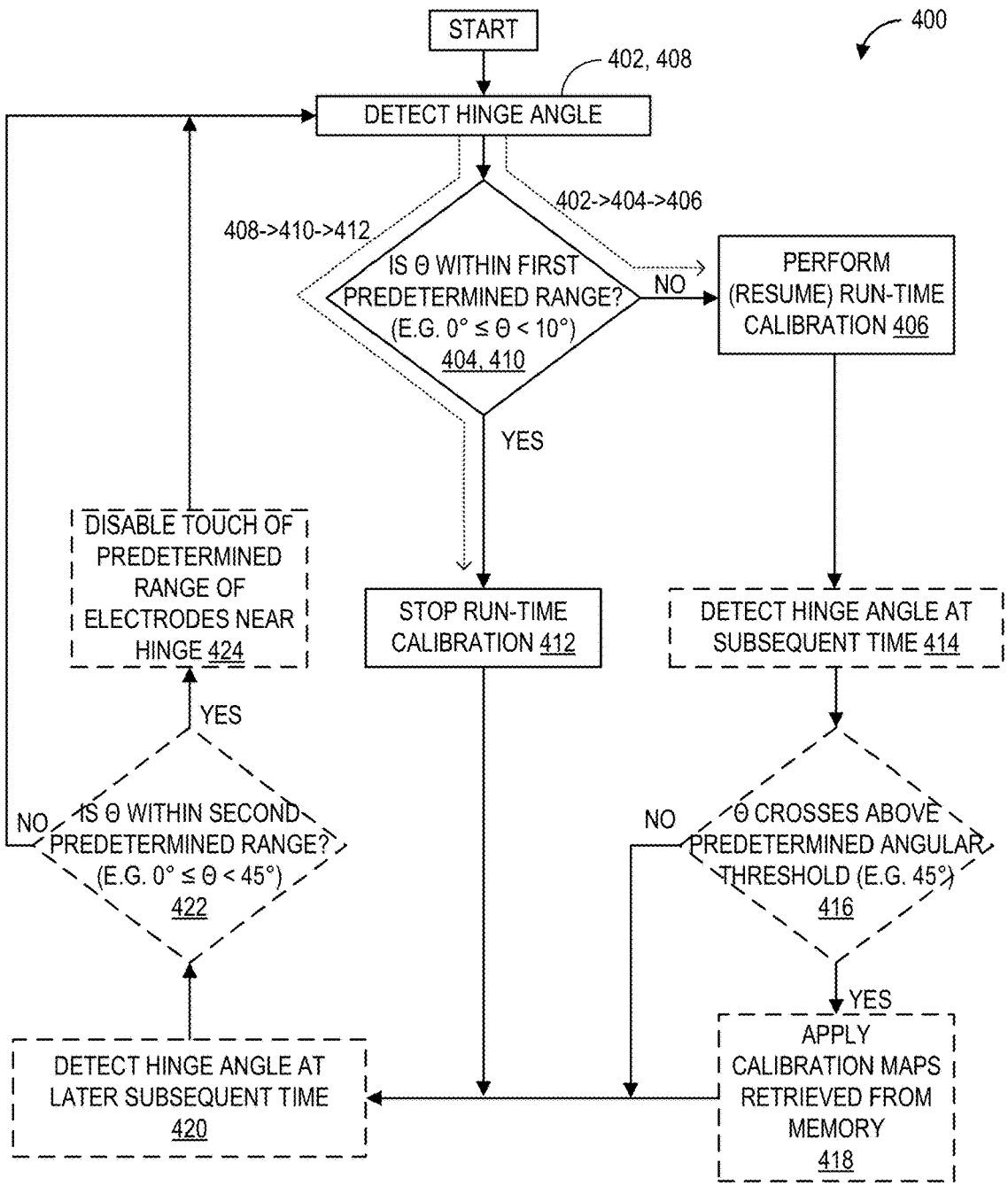
FIG. 5A shows a flowchart for a method according to one embodiment of the present disclosure.

With reference now to FIGS. 5A, a flow diagram is illustrated depicting an example method 400 for detecting a hinge angle and performing run-time calibration in a computing device that includes a first display device having a first capacitive touch sensor, a second display device having a second capacitive touch sensor, and a hinge positioned between and coupled to each of the first display device and the second display device, the first display device and second display device being rotatable about the hinge and separated by a hinge angle. The following description of method 400 is provided with reference to the software and hardware components described herein and shown in FIGS. 1-3. For example, the method 400 may be performed by the computing device 100, hardware, software, and/or firmware of the computing device 100, or a suitable combination of components described herein.

It will be appreciated that following description of method 400 is provided by way of example and is not meant to be limiting. Therefore, it is to be understood that method 400 may include additional and/or alternative steps relative to those illustrated in FIGS. 1A-3. Further, it is to be understood that the steps of method 400 may be performed in any suitable order. Further still, it is to be understood that one or more steps may be omitted from method 400 without departing from the scope of this disclosure. It will also be appreciated that method 400 also may be performed in other contexts using other suitable components.

Turning now to FIG. 5A, a flowchart of a method 400 is illustrated. The method 400, it will be appreciated is executed in a continuous loop during operation. Beginning with step 402, the method 400 includes, detecting a hinge angle at a first point in time, for example, on a first loop through the depicted algorithm during operation. At 404, the method includes a comparison operation to check with the detected hinge angle is within a first predetermined range, which may be zero to 10 degrees in one embodiment. In another embodiment, the first predetermined range may be zero to 20 degrees. Thus, during an exemplary first pass through step 404 on a first control loop, the method 400 may further include determining that the hinge angle at the first point in time is outside the first predetermined range (NO at 404). When the result is NO at 404, it will be appreciated that the control flow follows the dashed line along the branch indicated at 402—>404—>406. At 406, the method 400 further includes upon at least determining that the hinge angle is outside the first predetermined range, performing run-time calibration of at least a plurality of rows of the capacitive touch sensor of the first display device.

From 406, in a first example loop through the control loop of method 400, the method may pass through dashed steps 414, 416, and 418 (described below), and other optional steps 420, 422, and 424 (also described below) as it loops around once again to detecting a hinge angle at the top of the flowchart. Upon this subsequent pass through, the detecting step is referred to herein as step 408. Thus, at 408 the method 400 further includes detecting the hinge angle at a subsequent point in time. At 410, which is a subsequent pass through step 404, the method 400 further includes determining that the hinge angle at the subsequent point in time is within the first predetermined range (YES at 410), and the control flow will follow the dashed line from 408—>410—>412. At 412 the method 400 further includes upon determining that the hinge angle at the subsequent point is within the first predetermined range, stopping performing of run-time calibration of at least a portion of the capacitive touch sensor of the first display device and/or of at least a portion of the capacitive touch sensor of the second display device. It will be appreciated that stopping the run-time calibration is typically temporary, and thus may be referred to as disabling run time calibration, etc. For example stopping the run-time calibration may be achieved by partially performing the run-time calibration (for example at a circuit level) and ignoring the result and not computing the calibrated capacitance map for at least the portion of the capacitive touch sensor. After 412, the control flow may once again loop around through the dashed steps to detecting a hinge angle at the top of the flowchart, while the run-time calibration is stopped. it will be appreciated that in this situation a hinge angle that is outside the first predetermined range may again be detected and the method may resume performing run-time calibration. Thus, the method further includes, upon determining that the hinge angle at a later subsequent point in time is outside the first predetermined range, resuming performing run-time calibration of the capacitive touch sensor of the first display device and of the capacitive touch sensor of the second display device.

On one of the loops through the control loop of method 400, at 414, the method may include detecting a hinge angle at subsequent point in time, while run-time calibration is being performed. At 416, the method may include detecting that the hinge angle crosses above a predetermined angular threshold higher than an upper threshold of the first predetermined range. The predetermined angular threshold may be 45°, for example, or may be another angle within the range of 35° to 55°. Upon making this detection (YES at 416), the method may include, at 418, applying a first preset calibration map to the first display device 112A and a second preset calibration map to the second display device 112B, the first and second preset calibration maps being retrieved from memory.

The method may include disabling touch sensing on portions of the first and second display devices, when the hinge angle is in within a predetermined range, such as zero to 45 degrees. To achieve this, the method may include, at 420, detecting the hinge angle at a subsequent point in time, and at 422, determining whether the detected hinge angle is within a second predetermined range, for example of zero to 45 degrees, or alternatively of zero to 60 degrees. And, if so (YES at 422), the method may include disabling touch sensing by a predetermined range of electrodes of each of the first and capacitive touch sensors. If not, (NO at 422), the method returns to 402.

Figure 5B:
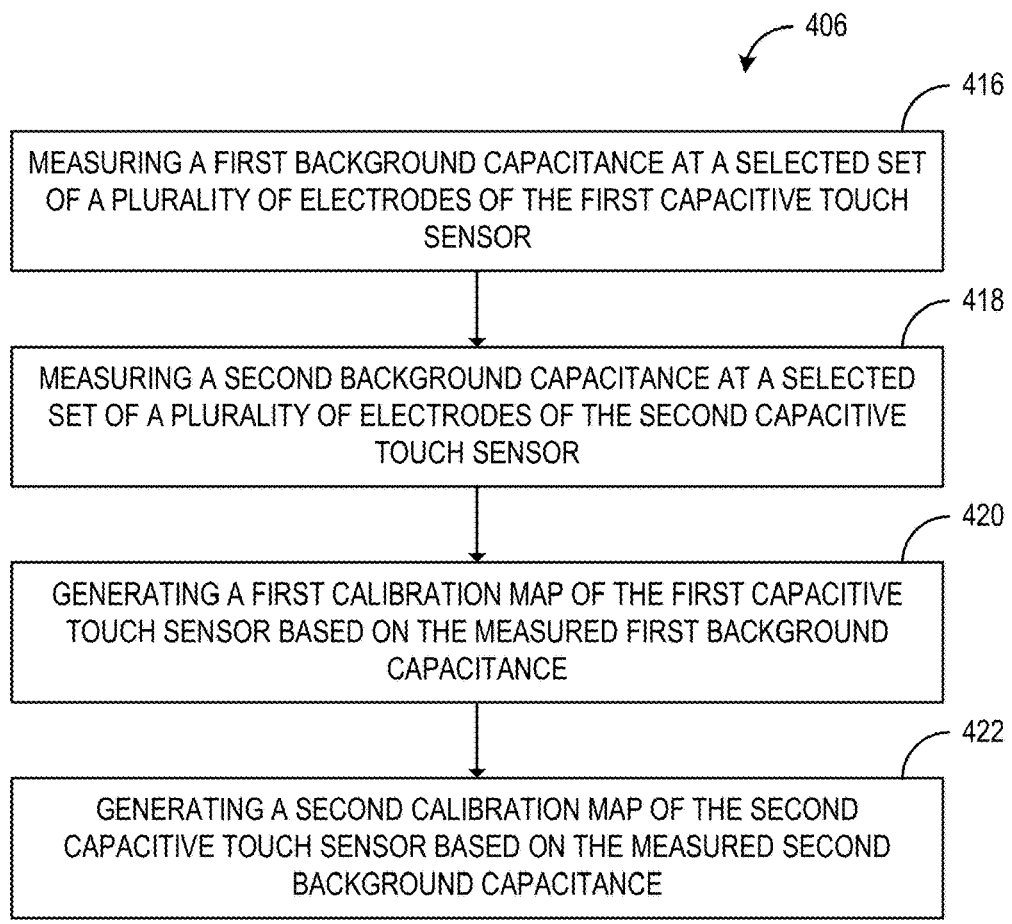
FIG. 5B shows a detail flowchart for performing one of the steps of the method of FIG. 5A.

Continuing with FIG. 5B, substeps of step 406 are provided. In a touch-free state, step 406 includes at 416, measuring a first background capacitance at a selected set of a plurality of electrodes of the first capacitive touch sensor. At 418, step 406 includes measuring a second background capacitance at a selected set of a plurality of electrodes of the second capacitive touch sensor. It will be appreciated that steps 416 and 418 occur during a window of a sensing cycle of the respective touch sensors. The window for measurement of the background or self-capacitance of each of the column and row electrodes may occur, for example, after a sensing cycle in which each column is driven and each row is read for each driven column. At 420, step 406 includes generating a first calibration map of the first capacitive touch sensor based on the measured first background capacitance. At 422, step 406 includes generating a second calibration map of the second capacitive touch sensor based on the measured second background capacitance.

Figure 6A:
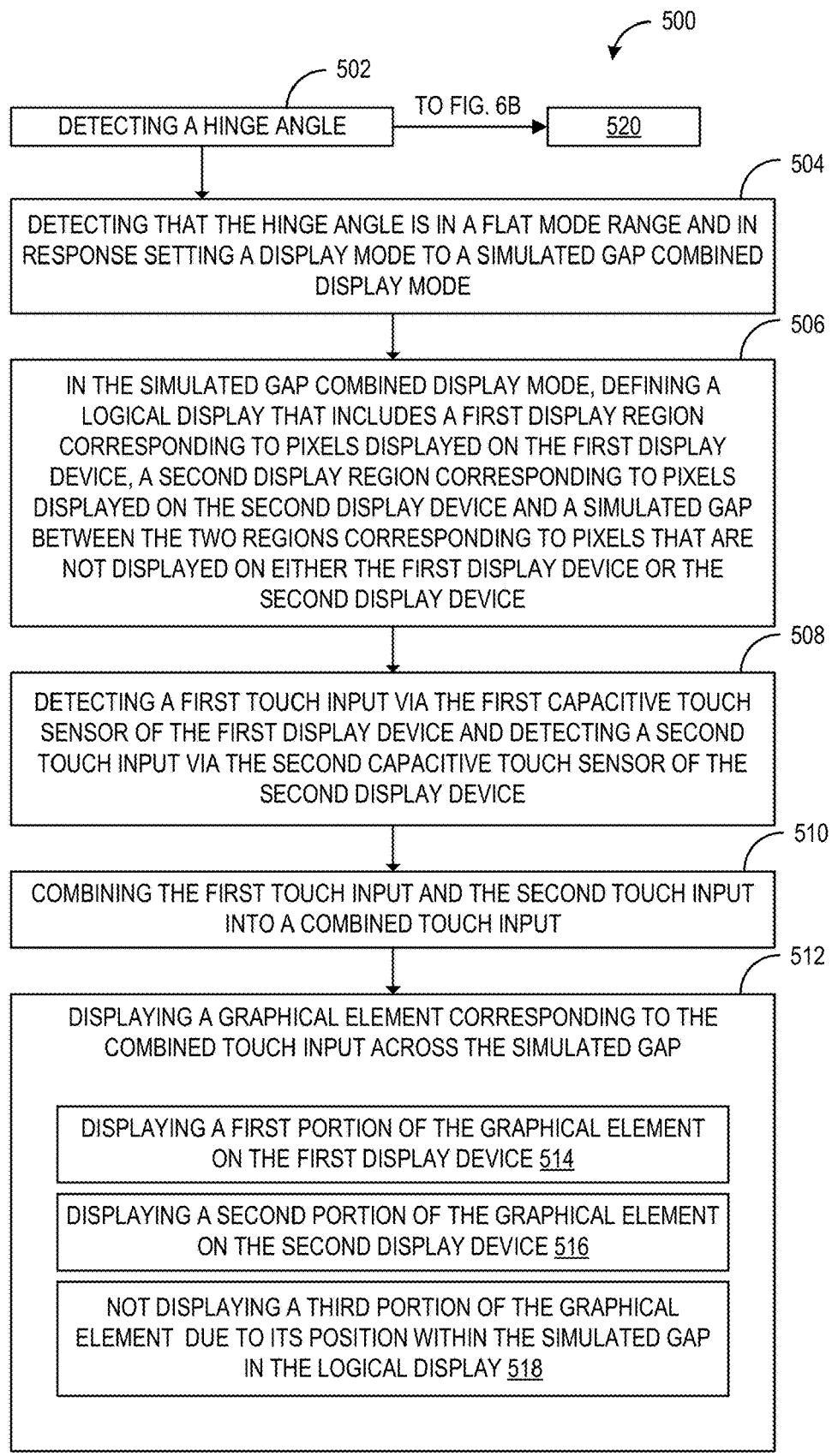
FIGS. 6A and 6B show a flowchart for a method according to another embodiment of the present disclosure.
Figure 6B:
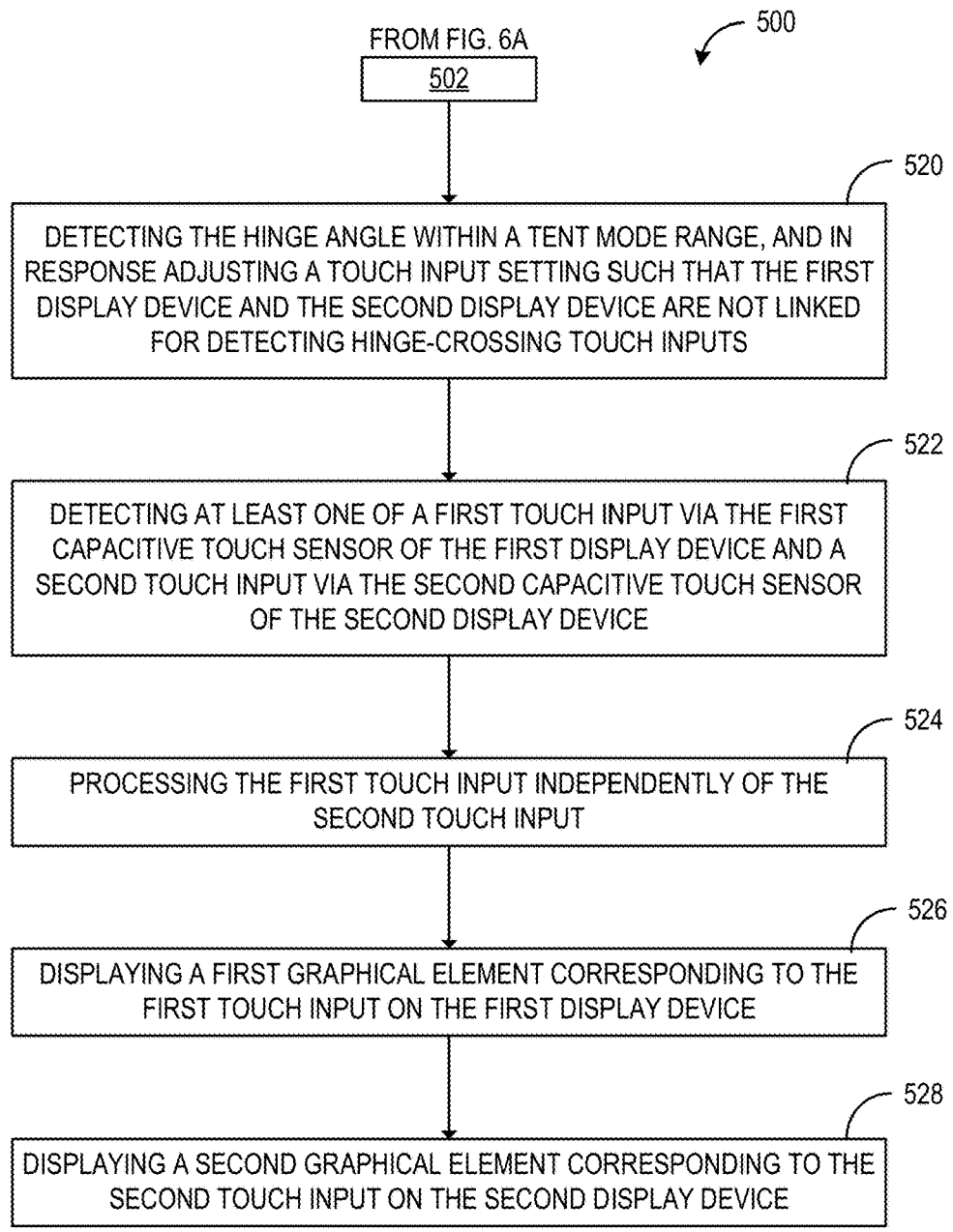

With reference now to FIGS. 6A and 6B, a flow diagram is illustrated depicting an example method 500 for selecting a mode of operation in a computing device that includes a first display device having a first capacitive touch sensor, a second display device having a second capacitive touch sensor, and a hinge positioned between and coupled to each of the first display device and the second display device, the first display device and second display device being rotatable about the hinge and separated by a hinge angle. The following description of method 500 is provided with reference to the software and hardware components described herein and shown in FIGS. 1A-3. For example, the method 500 may be performed by the computing device 100, hardware, software, and/or firmware of the computing device 100, or a suitable combination of components described herein.

It will be appreciated that following description of method 500 is provided by way of example and is not meant to be limiting. Therefore, it is to be understood that method 500 may include additional and/or alternative steps relative to those illustrated in FIGS. 1A-3. Further, it is to be understood that the steps of method 500 may be performed in any suitable order. Further still, it is to be understood that one or more steps may be omitted from method 500 without departing from the scope of this disclosure. It will also be appreciated that method 500 also may be performed in other contexts using other suitable components.

Turning now to FIGS. 6A, 6B, the method 500 includes at 502 detecting a hinge angle. At 504, the method 500 includes detecting that the hinge angle is in a flat mode range and in response setting a display mode to a simulated gap combined display mode. At 506, the method 500 includes in the simulated gap combined display mode, defining a logical display that includes a first display region corresponding to pixels displayed on the first display device, a second display region corresponding to pixels displayed on the second display device and a simulated gap between the two regions corresponding to pixels that are not displayed on either the first display device or the second display device. At 508, the method 500 includes detecting a first touch input via the first capacitive touch sensor of the first display device and detecting a second touch input via the second capacitive touch sensor of the second display device. At 510, the method 500 includes combining the first touch input and the second touch input into a combined touch input. At 512, the method 500 includes displaying a graphical element corresponding to the combined touch input across the simulated gap. At 514, the method 500 includes displaying a first portion of the graphical element on the first display device. At 516, the method 500 includes displaying a second portion of the graphical element on the second display device. At 518, the method 500 includes not displaying a third portion of the graphical element due to its position within the simulated gap in the logical display. At 520, the method 500 includes detecting the hinge angle within a tent mode range, and in response adjusting a touch input setting such that the first display device and the second display device are not linked for detecting hinge-crossing touch inputs. At 522, the method 500 includes detecting at least one of a first touch input via the first capacitive touch sensor of the first display device and a second touch input via the second capacitive touch sensor of the second display device. At 524, the method 500 includes processing the first touch input independently of the second touch input. At 526, the method 500 includes displaying a first graphical element corresponding to the first touch input on the first display device. At 528, the method 500 includes displaying a second graphical element corresponding to the second touch input on the second display device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
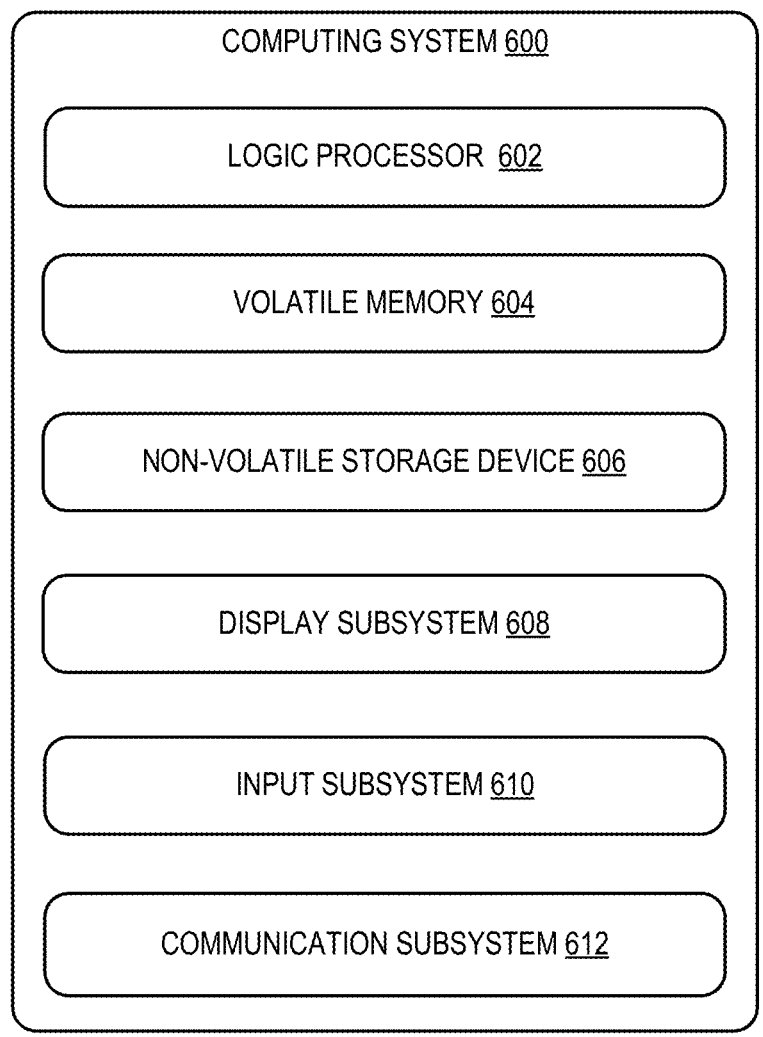
FIG. 7 shows an example computing system according to an embodiment of the present disclosure.

FIG. 7 schematically shows a non-limiting embodiment of a computing system 600 that can enact one or more of the methods and processes described above. Computing system 600 is shown in simplified form. Computing system 600 may embody the computing device 100 described above. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional description of the subject matter of the present disclosure. According to one aspect, a computing device is provided that comprises a processor, a first display device having a first capacitive touch sensor, a second display device having a second capacitive touch sensor, and a hinge positioned between and coupled to each of the first display device and the second display device, the first display device and second display device being rotatable about the hinge and separated by a hinge angle. The processor is configured to detect the hinge angle at a first point in time, determine that the hinge angle at the first point in time is outside a first predetermined range, and upon at least determining that the hinge angle is outside the first predetermined range, perform run-time calibration of at least a plurality of rows of the capacitive touch sensor of the first display device and of the capacitive touch sensor of the second display device. The processor is further configured to detect the hinge angle at a subsequent point in time, determine that the hinge angle at the subsequent point in time is within the first predetermined range, and upon determining that the hinge angle at the subsequent point is within the first predetermined range, stop performing run-time calibration of at least a portion of the capacitive touch sensor of the first display device and/or of at least a portion of the capacitive touch sensor of the second display device.

In this aspect, the processor may be further configured to, while run-time calibration is stopped, detect a first touch input via the first capacitive touch sensor of the first display device; and/or detect a second touch input via the second capacitive touch sensor of the second display device.

In this aspect, the processor may be further configured to, upon determining that the hinge angle at a later subsequent point in time is outside the first predetermined range, perform run-time calibration of the capacitive touch sensor of the first display device and of the capacitive touch sensor of the second display device.

In this aspect, the first predetermined range may be greater than or equal to 0° and less than 10°.

In this aspect, performing run-time calibration of the capacitive touch sensor of the first display device and of the capacitive touch sensor of the second display device may include, in a touch-free state, measuring a first background capacitance at a selected set of a plurality of electrodes of the first capacitive touch sensor, measuring a second background capacitance at a selected set of a plurality of electrodes of the second capacitive touch sensor, generating a first calibration map of the first capacitive touch sensor based on the measured first background capacitance, and generating a second calibration map of the second capacitive touch sensor based on the measured second background capacitance.

In this aspect, each of the first and second calibration maps may include a calibration value for each electrode in each of the respective first and second capacitive touch sensors.

In this aspect, upon determining that the hinge angle at the first point in time is outside the first predetermined range, the selected set of the plurality of electrodes of the capacitive touch sensors of the first and second display devices may include all of the plurality of electrodes of the capacitive touch sensors of the first and second display devices, and upon determining that the hinge angle at the subsequent point in time is within the first predetermined range, the selected set of the plurality of electrodes of the capacitive touch sensors of the first and second display devices may select only a subset of the plurality of electrodes of the capacitive touch sensors of the first and second display devices positioned at least a predetermined distance from the hinge.

In this aspect, the processor may be further configured to, upon detecting that the hinge angle crosses above a predetermined angular threshold higher than an upper threshold of the first predetermined range, apply a first preset calibration map to the first display device and a second preset calibration map to the second display device, the first and second preset calibration maps being retrieved from memory.

In this aspect, the predetermined angular threshold may be in a range between 35° to 55°.

In this aspect, the processor may be further configured to detect only on a portion of the first display device a first touch input via the first capacitive touch sensor of the first display device, the portion of the first display device being beyond a predetermined distance from the hinge, and detect only on a portion of the second display device a second touch input via the second capacitive touch sensor of the second display device, the portion of the second display device being beyond a predetermined distance from the hinge.

According to another aspect, a computing device is provided comprising a processor, a first display device having a first capacitive touch sensor, a second display device having a second capacitive touch sensor, and a hinge positioned between and coupled to each of the first display device and the second display device. The first display device and second display device are rotatable about the hinge and separated by a hinge angle. The processor is configured to detect that the hinge angle is in a flat mode range and in response set a display mode to a simulated gap combined display mode, in the simulated gap combined display mode, define a logical display that includes a first display region corresponding to pixels displayed on the first display device, a second display region corresponding to pixels displayed on the second display device and a simulated gap between the two regions corresponding to pixels that are not displayed on either the first display device or the second display device.

In this aspect, the processor may be further configured to detect a first touch input via the first capacitive touch sensor of the first display device, detect a second touch input via the second capacitive touch sensor of the second display device, and combine the first touch input and the second touch input into a combined touch input.

In this aspect, the processor may be further configured to display a graphical element corresponding to the combined touch input across the simulated gap,
- wherein in displaying the graphical element, a first portion of the graphical element is displayed on the first display, a second portion of the graphical element is displayed on the second display, and a third portion of the graphical element is not displayed due to its position within the simulated gap in the logical display.

In this aspect, the processor may be further configured to detect the hinge angle within a tent mode range, and in response adjust a touch input setting such that the first display device and the second display device are not linked for detecting hinge-crossing touch inputs.

In this aspect, the flat mode range may be greater than 135° and less than 225°, and the tent mode range may be greater than 225° and equal to or less than 360°.

In this aspect, the processor may be further configured to detect at least one of a first touch input via the first capacitive touch sensor of the first display device and a second touch input via the second capacitive touch sensor of the second display device, and process the first touch input independently of the second touch input.

In this aspect, the processor may be further configured to, as a result of processing the first touch input independently of the second touch input, display a first graphical element corresponding to the first touch input on the first display device and a second graphical element corresponding to the second touch input on the second display device.

In this aspect, the processor may be further configured to display the first display region on the first display device, and display the second display region on the second display device, wherein the first and second display regions are displayed on the computing device in relative positions with a gap between them so as to have a same aspect ratio of as the logical display.

In this aspect, a number of pixels in the simulated gap of the logical display multiplied by a pixel width in the first display device and second display device may be substantially equal to a width of a gap between displayed pixels on the first and second display devices.

In another aspect, a computing device is provided comprising a processor, a first display device having a first capacitive touch sensor; and a second display device having a second capacitive touch sensor. The first display device and the second display device are attached via a hinge. The processor is configured to detect a hinge angle between the first display device and the second display device at a first point in time, determine that the hinge angle at the first point in time is outside a first predetermined range, and upon at least determining that the hinge angle is outside the first predetermined range, perform run-time calibration of at least a plurality of rows of the capacitive touch sensor of the first display device and of the capacitive touch sensor of the second display device. The processor is further configured to detect the hinge angle between the first display device and the second display device at a subsequent point in time, determine that the hinge angle at the subsequent point in time is within the first predetermined range, and upon determining that the hinge angle at the subsequent point is within the first predetermined range, stop performing run-time calibration of the capacitive touch sensor of the first display device and/or of the capacitive touch sensor of the second display device. The processor is further configured to detect at a later subsequent time, a hinge angle in a flat mode range and set a display mode to a simulated gap combined display mode, in the simulated gap combined display mode, define a logical display that includes a first display region corresponding to pixels displayable on the first display, a second display region corresponding to pixels displayable on the second display and a simulated gap between the two regions corresponding to pixels that are not displayed on either the first display or the second display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a processor;
   a first display device having a first capacitive touch sensor;
   a second display device having a second capacitive touch sensor; and
   a hinge positioned between and coupled to each of the first display device and the second display device, the first display device and second display device being rotatable about the hinge and separated by a hinge angle;
   the processor being configured to:
     detect the hinge angle;
     determine that the hinge angle is within a first predetermined range;
     upon at least determining that the hinge angle is within the first predetermined range, inhibit performance of run-time calibration of at least a portion of the first capacitive touch sensor of the first display device and/or of at least a portion of the second capacitive touch sensor of the second display device; and while performance of the run-time calibration is inhibited:
  detect a first touch input via the first capacitive touch sensor of the first display device; and/or
  detect a second touch input via the second capacitive touch sensor of the second display device.

2. The computing device of claim 1, wherein the processor is further configured to: upon determining that the hinge angle at a later subsequent point in time is outside the first predetermined range,
  perform the run-time calibration of the capacitive touch sensor of the first display device and of the capacitive touch sensor of the second display device.

3. The computing device of claim 1, wherein
  the first predetermined range is greater than or equal to 0° and less than 10°.

4. The computing device of claim 1, wherein performance of the run-time calibration of the capacitive touch sensor of the first display device and of the capacitive touch sensor of the second display device includes, in a touch-free state:
  measuring a first background capacitance at a selected set of a plurality of electrodes of the first capacitive touch sensor; and
  generating a first calibration map of the first capacitive touch sensor based on the measured first background capacitance.

5. The computing device of claim 4, wherein performance of the run-time calibration of the capacitive touch sensor of the first display device and of the capacitive touch sensor of the second display device further includes, in a touch-free state:
  measuring a second background capacitance at a selected set of a plurality of electrodes of the second capacitive touch sensor; and generating a second calibration map of the second capacitive touch sensor based on the measured second background capacitance.

6. The computing device of claim 5, wherein each of the first and second calibration maps includes a calibration value for each electrode in each of the respective first and second capacitive touch sensors.

7. The computing device of claim 2, wherein the processor is further configured to:
  upon detecting that the hinge angle crosses above a predetermined angular threshold higher than an upper threshold of the first predetermined range, apply a first preset calibration map to the first display device and a second preset calibration map to the second display device, the first and second preset calibration maps being retrieved from memory.

8. The computing device of claim 7, wherein the predetermined angular threshold is in a range between 35° to 55°.

9. The computing device of claim 1, wherein the processor is further configured to disable touch sensing on portions of the first and second display devices by:
  detecting only on a portion of the first display device the first touch input via the first capacitive touch sensor of the first display device, the portion of the first display device being beyond a predetermined distance from the hinge; and
  detecting only on a portion of the second display device the second touch input via the second capacitive touch sensor of the second display device, the portion of the second display device being beyond a predetermined distance from the hinge.

10. A method for use with a computing device, the method comprising:
  detecting a hinge angle separating a first display device and a second display device that are rotatable about a hinge of the computing device;
  determining that the hinge angle is within a first predetermined range;
  upon at least determining that the hinge angle is within the first predetermined range, inhibiting performance of run-time calibration of at least a portion of a first capacitive touch sensor of the first display device and/or of at least a portion of a second capacitive touch sensor of the second display device; and
  while performance of the run-time calibration is inhibited:
    detecting a first touch input via the first capacitive touch sensor of the first display device; and/or
    detecting a second touch input via the second capacitive touch sensor of the second display device.

11. The method of claim 10, further comprising:
  upon determining that the hinge angle at a later subsequent point in time is outside the first predetermined range, performing the run-time calibration of the capacitive touch sensor of the first display device and of the capacitive touch sensor of the second display device.

12. The method of claim 10, wherein
  the first predetermined range is greater than or equal to 0° and less than 10°.

13. The method of claim 10, wherein performance of the run-time calibration of the capacitive touch sensor of the first display device and of the capacitive touch sensor of the second display device includes, in a touch-free state:
  measuring a first background capacitance at a selected set of a plurality of electrodes of the first capacitive touch sensor; and
  generating a first calibration map of the first capacitive touch sensor based on the measured first background capacitance.

14. The method of claim 13, wherein performance of the run-time calibration of the capacitive touch sensor of the first display device and of the capacitive touch sensor of the second display device further includes, in a touch-free state:
  measuring a second background capacitance at a selected set of a plurality of electrodes of the second capacitive touch sensor; and
  generating a second calibration map of the second capacitive touch sensor based on the measured second background capacitance.

15. The method of claim 11, further comprising:
  upon detecting that the hinge angle crosses above a predetermined angular threshold higher than an upper threshold of the first predetermined range, applying a first preset calibration map to the first display device and a second preset calibration map to the second display device, the first and second preset calibration maps being retrieved from memory.

16. The method of claim 15, wherein the predetermined angular threshold is in a range between 35° to 55°.

17. A method for use with a computing device, the method comprising:
  detecting, at a first point in time, a hinge angle between a first display device and a second display device;
  determining that the hinge angle at the first point in time is outside a first predetermined range;
  upon at least determining that the hinge angle is outside the first predetermined range, performing run-time calibration of at least a plurality of rows of a capacitive touch sensor of the first display device and of a capacitive touch sensor of the second display device;

detecting the hinge angle at a subsequent point in time;
determining that the hinge angle at the subsequent point in time is within the first predetermined range;
upon determining that the hinge angle at the subsequent point is within the first predetermined range, stopping run-time calibration of at least a portion of the capacitive touch sensor of the first display device and/or of at least a portion of the capacitive touch sensor of the second display device; and
while run-time calibration is stopped:
   detecting a first touch input via the first capacitive touch sensor of the first display device; and/or
   detecting a second touch input via the second capacitive touch sensor of the second display device.

18. The method of claim 17, wherein the first predetermined range is greater than or equal to 0° and less than 10°.

* * * * *